(12) United States Patent
Bensmann

(10) Patent No.: US 11,897,612 B2
(45) Date of Patent: Feb. 13, 2024

(54) WING FOR AN AIRCRAFT

(71) Applicant: AIRBUS OPERATIONS GmbH, Hamburg (DE)

(72) Inventor: Stefan Bensmann, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 17/779,303

(22) PCT Filed: Nov. 17, 2020

(86) PCT No.: PCT/EP2020/082385
§ 371 (c)(1),
(2) Date: May 24, 2022

(87) PCT Pub. No.: WO2021/104938
PCT Pub. Date: Jun. 3, 2021

(65) Prior Publication Data
US 2022/0411044 A1 Dec. 29, 2022

(30) Foreign Application Priority Data
Nov. 25, 2019 (DE) ...................... 10 2019 131 841.6

(51) Int. Cl.
*B64C 9/24* (2006.01)
*B64C 9/02* (2006.01)

(52) U.S. Cl.
CPC . *B64C 9/24* (2013.01); *B64C 9/02* (2013.01)

(58) Field of Classification Search
CPC .... B64C 9/22; B64C 9/24; B64C 9/26; B64C 9/02
See application file for complete search history.

(56) References Cited

U.S. PATENT DOCUMENTS

| 8,919,703 B2 | 12/2014 | Parker |
| 2006/0249627 A1 | 11/2006 | Martin Hernandez |

FOREIGN PATENT DOCUMENTS

| EP | 2 851 285 | | 3/2015 | |
| EP | 2851285 A1 | * | 3/2015 | ............. B64C 13/00 |

(Continued)

OTHER PUBLICATIONS

International Search Report for PCT/EP2020/082385, dated Feb. 19, 2021, 4 pages.

(Continued)

*Primary Examiner* — Philip J Bonzell
*Assistant Examiner* — Eric Acosta
(74) *Attorney, Agent, or Firm* — Nixon & Vanderhye P.C.

(57) ABSTRACT

A wing for an aircraft is disclosed including a fixed wing, a high-lift device and a hold-down arrangement arranged between two supports of the high lift device having a first hold-down element attached to the high-lift device and a second hold-down element attached to the fixed wing. The first hold-down element contacts the second hold-down element when the high-lift device is in a retracted position in which it prevents a trailing edge of the high-lift device from detaching from an upper surface of the fixed wing when the fixed wing bends in the spanwise direction. One of the hold-down elements is a load-limited hold-down element which comprises a biasing means. When the load transmitted through the hold-down arrangement exceeds an operational threshold, elastic deformation of the biasing element results in the hold-down arrangement no longer preventing the trailing edge high-lift device from detaching from the upper surface of the fixed wing.

11 Claims, 4 Drawing Sheets

(56) References Cited

FOREIGN PATENT DOCUMENTS

Figure 1:
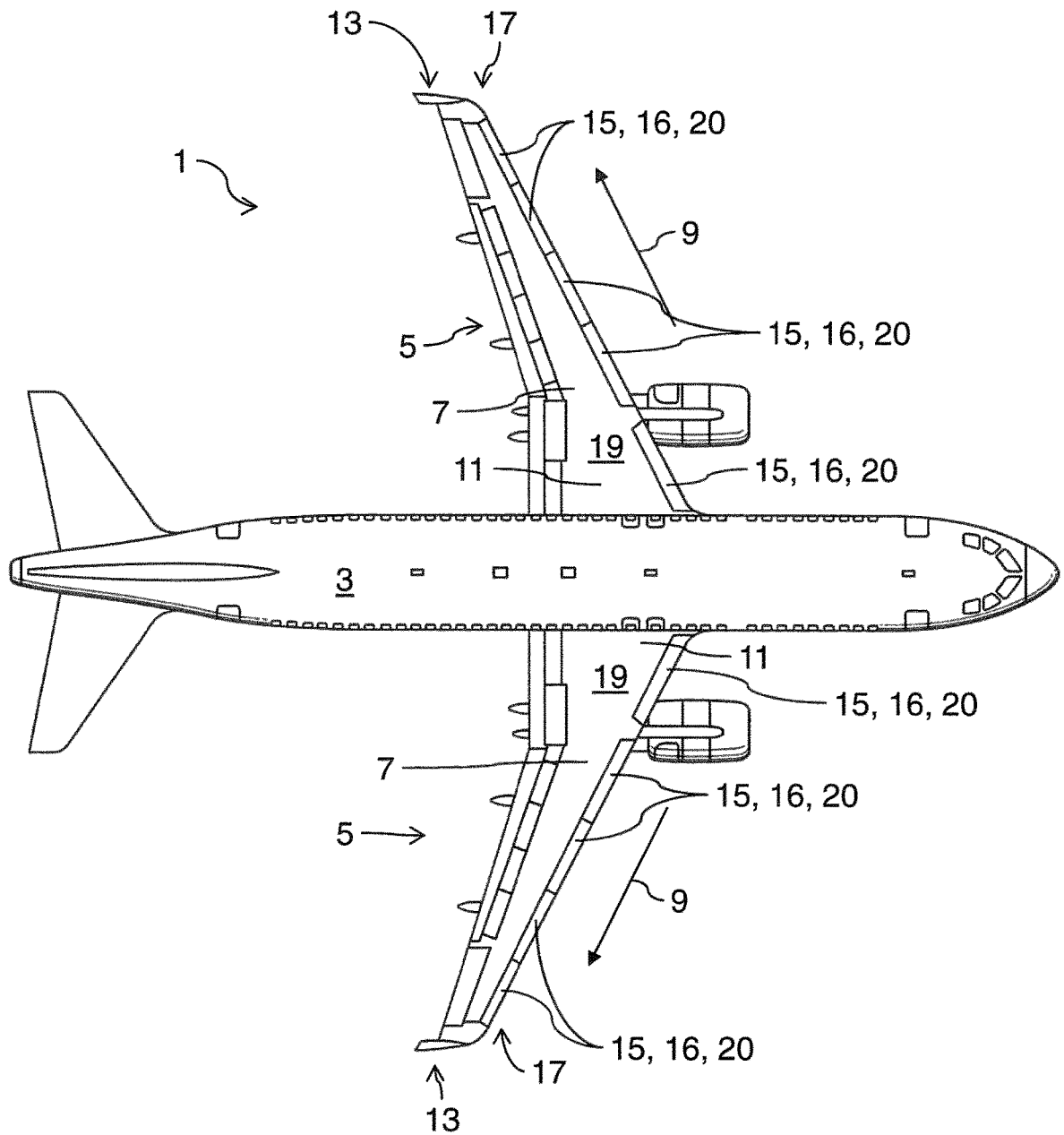

| | | | | |
|---|---|---|---|---|
| EP | 2 998 217 | 3/2016 | | |
| GB | 2 380 173 | 4/2003 | | |
| GB | 2380173 A | * 4/2003 | ............... | B64C 9/26 |
| WO | 2018/189299 | 10/2018 | | |

OTHER PUBLICATIONS

Written Opinion of the ISA for PCT/EP2020/082385, dated Feb. 19, 2021, 8 pages.
Search Report for DE10 2019 131 841.6, dated Sep. 10, 2020, 6 pages.

* cited by examiner

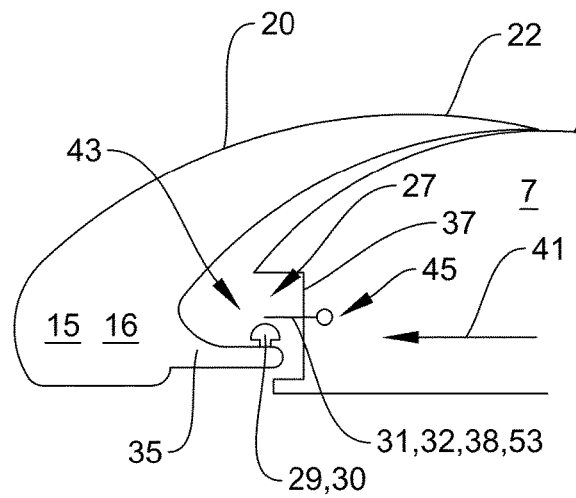
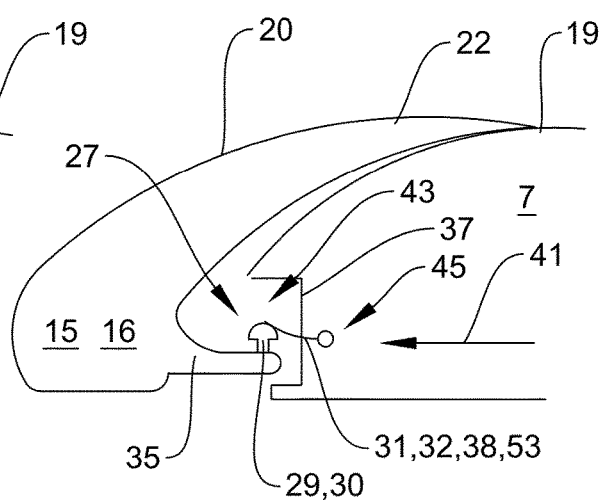
FIG. 5A    FIG. 5B
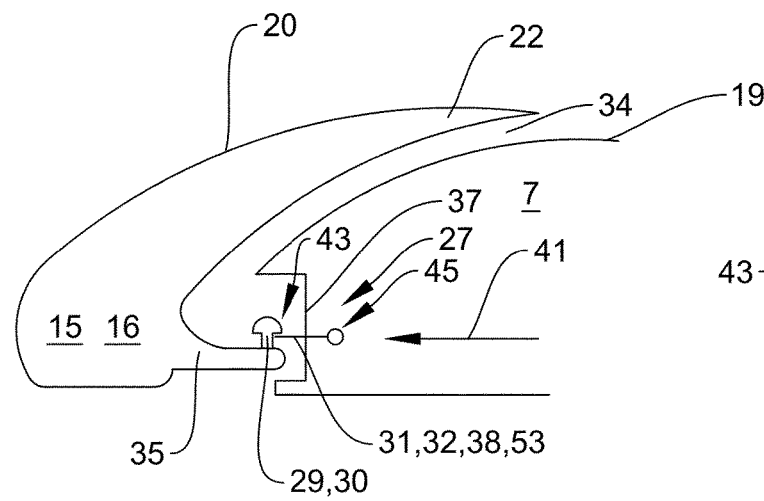
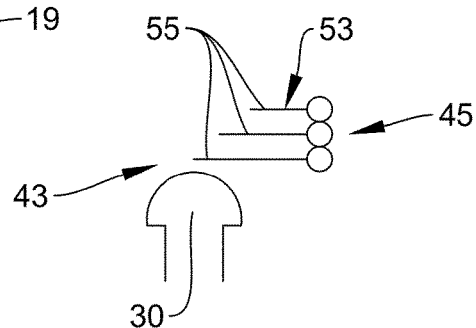
FIG. 5C    FIG. 5D

WING FOR AN AIRCRAFT

CROSS REFERENCE TO RELATED APPLICATIONS

The present application is a National Phase of International Application Number PCT/EP2020/082385 filed Nov. 17, 2020, which designated the U.S. and claims priority benefits from German Patent Application Number DE 10 2019 131 841.6 filed Nov. 25, 2019, the entire contents of each of which are hereby incorporated by reference.

The present invention is directed to a wing for an aircraft comprising a fixed wing, a high-lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element only contacts the second hold-down element when the high-lift device is in the retracted position. In the retracted position of the high-lift device the hold-down arrangement prevents the trailing edge of the high-lift device from detaching from the upper surface of the fixed wing when the fixed wing deforms or bends in the spanwise direction. The invention is further directed to a hold-down arrangement and an aircraft comprising a wing.

High-lift devices such as slats are commonly mounted to a leading edge of a fixed wing of an aircraft using a first support and a second support. For example, slats are mounted using a master slat track and a slave slat track. Both slat tracks are driven, however only the master slat track fixes the position of the slat in a spanwise direction whereas the slave slat track does not fix the slat position in the spanwise direction but allows a spanwise displacement of the slat relative to the slave slat track. For aerodynamic reasons the slat is mounted to the fixed wing such that in the retracted position an upper surface of the slat extends flush with an upper surface of the fixed wing which forms the suction side of the wing. The slat is, in particular, arranged such that there is no gap between the upper surface of the fixed wing and the trailing edge of the slat, i.e., the trailing edge is in extended contact with the upper surface of the fixed wing, and the shape of the slat in the spanwise direction of the wing generally follows the shape of the fixed wing.

As the slat is mounted to the fixed wing in two points only which are spaced from one another in the spanwise direction of the wing, bending or deformation of the fixed wing along the spanwise direction is not transmitted to the slat. This may result in the trailing edge of the slat not being in continuous or extended contact with the upper surface of the fixed wing or even completely detaching from the upper surface. Also, the shape of the slat in the spanwise direction of the wing does not conform to the shape of the fixed wing anymore.

In order to ensure that the trailing edge of the high-lift device remains in extended contact with the upper surface of the fixed wing when the high-lift device is in the retracted position, a hold-down arrangement is provided between the first support and the second support which prevents the trailing edge of the high-lift device from detaching from the upper surface and forces the slat to deform with the fixed wing. To this end the hold-down arrangement comprises a first hold-down element attached to the high-lift device and a second hold-down element attached to the fixed wing. The hold-down elements are only in contact with each other when the slat is in the retracted position.

When a wing tip of the fixed wing bends upwards during flight, for example, due to the lift generated by the fixed wing, the second hold-down element pushes downwards against the first hold-down element due to the deformation of the fixed wing and forces the high-lift device to deform with the fixed wing. Thus, in essence a third contact point between the high-lift device and the fixed wing is created in addition to the first and second support which in the retracted position ensures that the high-lift device is forced to deform with the fixed wing so that the upper surface of the high-lift device remains flush with the upper surface of the fixed wing.

The transfer of the spanwise deformation from the fixed wing to the high-lift device by means of the hold-down arrangement requires a high-lift device that is able to withstand the same spanwise deformation of the fixed wing and the loads generated by the hold-down arrangement. Thus, a high-lift device being forced to deform with the fixed wing and, thereby, provide the necessary aerodynamic performance has to be more robust and in consequence heavier than a high-lift device that does not follow the spanwise deformation of the fixed wing. Also, the fixed wing has to be more robust as it has to bear the additional loads that are required for deforming the high-lift device.

In view of the above it is an object of the present invention to provide an improved wing, an improved hold-down arrangement and an improved aircraft.

The problem underlying the present invention is solved by a wing according to claim 1, a hold-down arrangement and an aircraft according to the pebding claims.

Preferred embodiments of the wing according to the present invention are the subject matter of the dependent claims.

According to a first aspect the problem underlying the present invention is solved by a wing for an aircraft comprising a fixed wing, a high lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element is in contact with the second hold-down element when the high-lift device is in the retracted position but is not in contact with the second hold-down in element when the high-lift device is in the deployed position. In the retracted position of the high-lift device the hold-down arrangement prevents the trailing edge of the high-lift device from detaching from the upper surface of the fixed wing when the fixed wing bends or deforms in the spanwise direction. One of the first hold-down element and the second hold-down element is a load-limited hold-down element comprising an elastically deformable biasing means and the other of the first hold-down element and the second hold-down element is a rigid hold-down element. The hold-down arrangement is configured such that when the wing is in a first operating mode in which the high-lift device is in the retracted position and a load transmitted through the hold-down arrangement for preventing the trailing edge of the high-lift device from detaching from the upper surface of the fixed wing does not exceed an operational threshold, the biasing means of the load-limited hold-down element acts onto the rigid hold-down element to prevent the trailing edge of the high-lift device from detaching from the upper surface of the fixed wing, and wherein the hold-down arrangement is further configured such that when the wing is in a second operating mode in which the high-lift device is the retracted position and the load transmitted through the hold-down arrangement for preventing the trailing edge of the high-lift device from detaching from the upper surface of the fixed wing reaches and exceeds the operational threshold, elastic deformation of the biasing means results in the biasing means not further acting onto the rigid hold-down element for preventing the trailing edge of the high-lift device from detaching from the upper surface of the fixed wing.

In other words, the present wing for an aircraft is, for example, a main wing with a fixed wing and a high-lift device in form of a slat. The fixed wing has a leading edge which extends along but not necessarily parallel to the spanwise direction of the fixed wing. An upper surface of the fixed wing forms a suction side of the fixed wing and may also be referred to as a suction surface of the fixed wing. The fixed wing extends in the spanwise direction between an inward or inboard end which may, for example, be adapted to be attached to a fuselage of an aircraft, and a wing tip which forms the outer or outboard end of the fixed wing.

When the aircraft is in flight, the lift created by the fixed wing deforms the wing. In particular, the wing is curved upwards such that the wing tip moves upwards relative to the inward end of the fixed wing. The amount by which the fixed wing bends or deforms depends on various factors among which are speed of the aircraft and weather conditions. For example, the deformation of the fixed wing increases considerably when an aircraft accelerated from take-off speed to cruise speed.

The high-lift device attached to the wing is mounted to the wing using only two supports, a first support and a second support. The supports which may, for example, be slat tracks are used to move the high-lift device between a retracted and one or more deployed positions. When the high-lift device is in the retracted position, its trailing edge shall for aerodynamic reasons be in extended contact with the upper surface of the fixed wing such that an upper surface of the high-lift device extends flush with the upper surface of the fixed wing, i.e., such that no gap exists between the upper surface of the fixed wing and the trailing edge of the high-lift device.

As previously discussed, due to the changing curvature of the fixed wing during flight and the fact that the high-lift device is only mounted in two points to the fixed wing, the slat does not deform with the fixed wing in the spanwise direction. Hence, a hold-down arrangement comprising a first and a second hold down element is used to provide a third contact point between the high-lift device and the fixed wing when the high-lift device has been retracted, i.e., is in the retracted position. The first hold-down element is attached or mounted to the high-lift device and the second hold-down element is mounted to the fixed wing such that the first hold-down element and the second hold-down element only come into contact or engage when the high-lift device is in the retracted position. By means of the hold-down arrangement it is ensured that a relative downward deformation of the fixed wing in the spanwise direction between the first and the second support of the high-lift device corresponding to an upward movement of the wing tip of the fixed wing relative to the fixed wing's inward end is transferred to the high-lift device such that the high-lift device follows the curvature or deformation of the fixed wing. As a result, the trailing edge of the high-lift device constantly maintains extended contact with the upper surface of the fixed wing.

However, according to the present invention one of the first and the second hold-down elements is a load-limited hold-down element comprising an elastically deformable biasing means and the other of the first and the second hold-down element is a rigid hold-down element. As will be set out in the following paragraphs in more detail, the biasing means of the load-limited hold-down element is configured to deform elastically when loads for keeping the trailing edge in extended contact with the upper surface of the fixed wing are transmitted through the hold-down arrangement are below an operational threshold but nevertheless continuously interacts with the rigid hold-down element. When the load acting through the hold-down arrangement onto the high-lift device reaches and exceeds the operational threshold, the biasing means deforms so much that a previously existing load path through the load-limited hold-down element and the rigid hold-down element is interrupted and the high-lift device is not further prevented from detaching from the upper surface of the fixed wing.

As already indicated, when the high-lift device is initially moved to the retracted position and the load transmitted through the hold-down arrangement is below the operational threshold, the biasing means ensures that the load-limited hold-down element is kept in contact with the rigid hold-down element. In this configuration which is also referred to as the first operating mode of the wing, the hold-down arrangement keeps the trailing edge of the high-lift device in contact with the upper surface of the fixed wing. To this end, a load path is formed by the hold-down arrangement between the fixed wing and the high-lift device that transfers any relative downward deformation of the fixed wing in the spanwise direction between the first support and the second support to the high-lift device.

However, when the load or force transmitted through the load-limited hold-down element exceeds the operational threshold, the load-limited hold-down element deforms to a degree in which the load-limited hold-down element is not kept in contact with the rigid hold-down element in a way in which loads for keeping the high-lift device in position can be transferred through the hold-down arrangement. Hence, the hold-down arrangement can no longer prevent the trailing edge of the high-lift device from detaching from the upper surface of the fixed wing. In other words, due to the deformation of the load-limited hold-down element, the load path between the fixed wing and the high-lift device is interrupted and deformations of the fixed wing along the spanwise direction are not further transmitted to the high lift device.

The operational threshold may, for example, be chosen such that the high-lift device is kept in extended contact with the upper surface of the fixed wing while deformation of the fixed wing is within limits that are experienced during regular flights but the trailing edge of the high-lift device is allowed to move away from the upper surface when deformations occur that are only experienced in extreme corners of the flight envelope in which the high-lift device is subject of very high loads caused by the enforced deformation and the reduced aerodynamic performance due to the trailing edge of the high-lift device detaching from the upper surface of the fixed wing are tolerable. In any case the operational threshold is chosen such that the load-limited hold-down stops preventing the trailing edge of the high-lift device from detaching from the upper surface of the fixed wing well-before the deformation of the fixed wing reaches operational limits.

Since the deformation of the biasing device is elastic, it may return to its original shape once the loads do not exceed the operational threshold any further whereby the functioning of the hold-down arrangement in the first operating mode of the wing is reestablished.

Thereby, the loads transmitted through the hold-down arrangement are advantageously limited to loads occurring during regular flight conditions for which it is essential to keep the trailing edge of the high-lift device in extended contact with the upper surface of the fixed wing to improve the aerodynamic performance of the fixed wing. However, during rare and extreme flight situations in which the curvature of the fixed wing along the spanwise direction exceeds commonly occurring curvatures, the load-limited hold-down element no longer forces the high-lift device to deform with the fixed wing. In such a rare case aerodynamic performance of the wing are of less concern and it is instead preferred to reduce the loads acting on the high-lift device and the fixed wing or, in other words, to limit the enforced deformation of the high-lift device. As the maximum deformation of the high-lift device is reduced as compared to a rigid or non-deforming hold-down element, the high-lift device may be constructed less robust. This may, in particular, advantageously allow reducing the weight of the high-lift device. Further, since the load on the fixed wing is also reduced as it does not have to bear the additional load that is required to deform the high-lift device.

The operational threshold may, for example, be chosen such that elastic deformation of the biasing means results in the biasing means not further acting onto the rigid hold-down element for preventing the trailing edge of the high-lift device from detaching from the upper surface of the fixed wing when a load factor exceeds a value of 2.0, preferably of 1.75 and most preferably of 1.3, where the load factor is defined as the ratio of lift of an aircraft to its weight.

In a preferred embodiment the second hold-down element is the load-limited hold-down element. In other words, it is preferred that the load-limited hold-down element is the hold-down element mounted to the fixed wing.

In a preferred embodiment the load-limited hold-down element extends from a fixed end to a free end in an extension direction when the load-limited hold-down element is not in contact with the rigid hold-down element. The fixed end of the load-limited hold-down element is attached at an attachment point to the fixed wing in case the second hold-down element is the load-limited hold-down element or is attached an attachment point to the high-lift device in case the first hold-down element is the load-limited hold-down element. The hold-down arrangement is configured such that when the wing is in the first operating mode, the free end of the load-limited hold-down element interacts with a contact surface of the rigid hold-down element, the contact surface being tilted relative to the extension direction of the load-limited hold-down element at an angle of less than 90°. The hold-down arrangement is further configured such that when the wing is in the second operating mode, the free end of the cantilever spring does not interact with the rigid hold-down element or interacts with a glide surface of the rigid hold-down element extending perpendicular to the extension direction of the load-limited hold-down arrangement.

Hence, in the preferred embodiment the interplay of the load-limited hold-down element and the rigid hold-down element is defined in more detail. The load-limited hold-down element has a free end and an opposing fixed end between which the load-limited hold-down element extends. The fixed end is in any case mounted to that part of the wing to which the load-limited hold-down element is attached. The direction in which the load-limited hold-down element extends away from the fixed end is referred to as its extension direction. In case the load-limited hold-down element is the second hold-down element, the extension direction may, for example, generally correspond to the cord direction of the fixed wing. Preferably, the extension direction is generally perpendicular to the spanwise direction of the wing and a direction in which the load needs to be transmitted from the fixed wing to the high-lift device for keeping the high-lift device in extended contact with the fixed wing when the fixed wing deforms along the spanwise direction.

While the wing is in the first operating mode, the free end of the load-limited hold-down element is in contact with a contact surface of the rigid hold-down element and can exert a downward force on the rigid hold-down element to keep the trailing edge of the high-lift device in extended contact with the upper surface of the fixed wing. Here, the term free end does not necessarily refer to the most outward end of the load-limited hold-down element relative to the fixed end but generally indicates the section of the outward section of the load-limited hold-down element.

The contact surface of the rigid hold-down element is tilted relative to or extends at an angle relative to the extension direction of the load-limited hold-down that is less than 90°. The term tilted implies that it does not extend parallel to the extension direction and the tile or extension angle does not have to be constant as discussed below in more detail. The angle at which the contact surface is tilted to the extension direction can advantageously be used to control the amount of the force that is required by the biasing means to keep the high-lift device in position. Generally speaking, the steeper the tilt angle, the more force is required to keep the high-lift device in position. On the other hand, a smaller tilt angle provides a stiffer hold-down arrangement that can keep the high-lift device in extended contact with the fixed wing at higher deformation of the fixed wing for the same biasing means.

When the wing transitions to the second operating mode, the free end is no longer in contact with the contact surface but either entirely loses contact with the rigid hold-down arrangement or is in contact with a glide surface of the rigid hold-down element that extends perpendicular to the extension direction of the load-limited hold-down element and, preferably, parallel to the direction in which the high-lift device is urged by the hold-down arrangement in the first operating mode so keep the trailing edge of the high-lift device in contact with the upper surface of the fixed wing. Hence, when the wing is in the second operating mode, there is advantageously essentially no load transfer possible from the load-limited hold-down element to the rigid hold-down element in the vertical direction.

It is further preferred that the contact surface of the rigid hold-down element is shaped such that a tilt of an area of the contact surface in contact with the load-limited hold-down element relative to the extension direction of the load-limited hold-down element continuously increases towards 90° with increasing load which is transmitted through the hold-down arrangement for preventing the trailing edge of the high-lift device from detaching from the upper surface of the fixed wing in the first operating mode of the wing. A continuous increase of the slope of the contact surface allows softening the transition from the first operating mode to the second operating mode.

Alternatively, the contact surface may be tilted at a constant angle relative to the extension direction of the load-limited hold-down element.

In a preferred embodiment the load-limited hold-down element is a cantilever spring, wherein the cantilever spring is bend in an upwards direction when load is transmitted through the hold-down arrangement for preventing the trailing edge of the high-lift device from detaching from the upper surface of the fixed wing in the first operating mode of the wing. A cantilever spring may also be referred to as a leaf spring and is elastically deformed in that its free end bends upwards. Hence, the cantilever spring only extends in the extension direction of the load-limited hold-down element when it is not under load.

Preferably, the cantilever spring is a laminate cantilever spring formed from a plurality of layers, wherein the number of layers forming the cantilever spring decreases towards the free end of the load-limited hold-down element and wherein at least some of the layers are not connected towards the free end of the load-limited hold-down element such that bending the cantilever spring at the free end in a downwards direction which is directed opposite to the upwards direction requires less force than bending the cantilever spring in the upwards direction. Using a laminate cantilever spring has the advantage that significantly less force is required for moving the rigid hold-down element in the downwards direction past the free end of the cantilever spring. Only those leafs of the laminate cantilever spring that form the free end need to be deformed in order to be able to push the rigid hold-down element downwards which reduces the effort that is necessary to reestablish the load transfer path through the hold-down arrangement when the wing returns from the second operating mode to the first operating mode.

Alternatively, the biasing means may be a compression spring which is being compressed along the extension direction of the load-limited hold-down element when the wing is in the first operating mode and load is transmitted through the hold-down arrangement for preventing the trailing edge of the high-lift device from detaching from the upper surface of the fixed wing in the first operating mode of the wing. The compression spring is advantageously guided and allows a well-defined and controlled elastic deformation.

Preferably, a roller is mounted at the free end of the load-limited hold-down element for reducing friction between the load-limited hold-down element and the rigid hold-down element, wherein the hold-down arrangement is configured such that the rigid hold-down element interacts with the roller when the wing is in the first operating mode. This advantageously prevents unwanted stick-and-slip effects that could inadvertently result in an increase of the operational threshold.

In a preferred embodiment the high-lift device is a slat, wherein the first support is preferably a master slat track and the second support is preferably a slave slat track.

In a second aspect the problem underlying the present invention is solved by a hold-down arrangement for a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position but is not in contact when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction. One of the first hold-down element and the second hold-down element is a load-limited hold-down element comprising an elastically deformable biasing means and the other of the first hold-down element and the second hold-down element is a rigid hold-down element. The hold-down arrangement is configured such that when the wing is in a first operating mode in which the high-lift device is in the retracted position and a load transmitted through the hold-down arrangement for preventing the trailing edge of the high-lift device from detaching from the upper surface of the fixed wing does not exceed an operational threshold, the biasing means of the load-limited hold-down element acts onto the rigid hold-down element to prevent the trailing edge of the high-lift device from detaching from the upper surface of the fixed wing, and wherein the hold-down arrangement is further configured such that when the wing is in a second operating mode in which the high-lift device is the retracted position and the load transmitted through the hold-down arrangement for preventing the trailing edge of the high-lift device from detaching from the upper surface of the fixed wing reaches and exceeds the operational threshold, elastic deformation of the biasing means results in the biasing means not further acting onto the rigid hold-down element for preventing the trailing edge of the high-lift device from detaching from the upper surface of the fixed wing.

The hold-down arrangement may be configured in the same way as the hold-down arrangement which has been described as part of the preferred embodiments of a wing for an aircraft. For the sake of brevity, details of these embodiments are not repeated here but reference is made to the preceding description. The advantages of the hold-down arrangement correspond to the advantages of the respective embodiments of a wing for an aircraft.

In a preferred exemplary aspect the problem underlying the present invention is solved by using a hold-down arrangement in a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position and is not in contact with the second hold-down element when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction One of the first hold-down element and the second hold-down element is a load-limited hold-down element comprising an elastically deformable biasing means and the other of the first hold-down element and the second hold-down element is a rigid hold-down element. The hold-down arrangement is configured such that when the wing is in a first operating mode in which the high-lift device is in the retracted position and a load transmitted through the hold-down arrangement for preventing the trailing edge of the high-lift device from detaching from the upper surface of the fixed wing does not exceed an operational threshold, the biasing means of the load-limited hold-down element acts onto the rigid hold-down element to prevent the trailing edge of the high-lift device from detaching from the upper surface of the fixed wing, and wherein the hold-down arrangement is further configured such that when the wing is in a second operating mode in which the high-lift device is the retracted position and the load transmitted through the hold-down arrangement for preventing the trailing edge of the high-lift device from detaching from the upper surface of the fixed wing reaches and exceeds the operational threshold, elastic deformation of the biasing means results in the biasing means not further acting onto the rigid hold-down element for preventing the trailing edge of the high-lift device from detaching from the upper surface of the fixed wing.

The hold-down arrangement used in the wing may in particular correspond to the different embodiments of hold-down arrangements previously described.

Finally, in a further aspect an aircraft comprising a fuselage and a wing as in the previously described embodiments solves the problem underlying the present invention. The advantages of the aircraft correspond to the advantages of the respective embodiment of a wing comprised therein.

Figure 2:
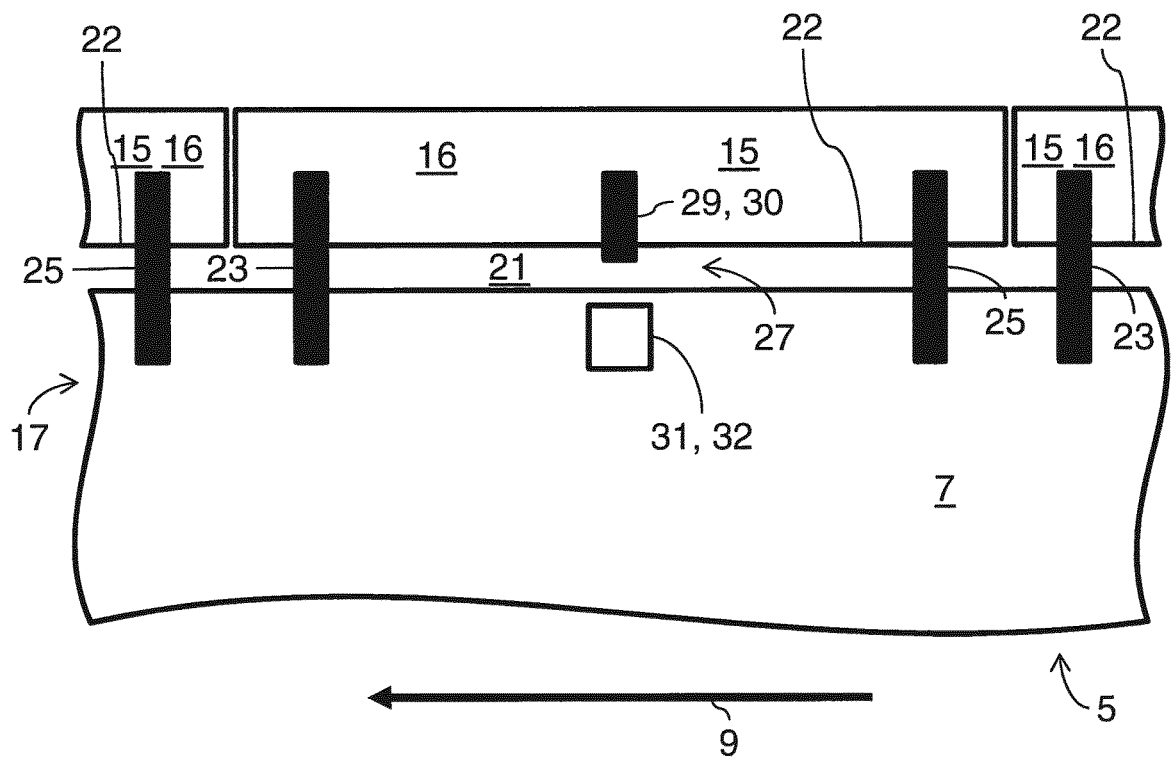
Figure 3:
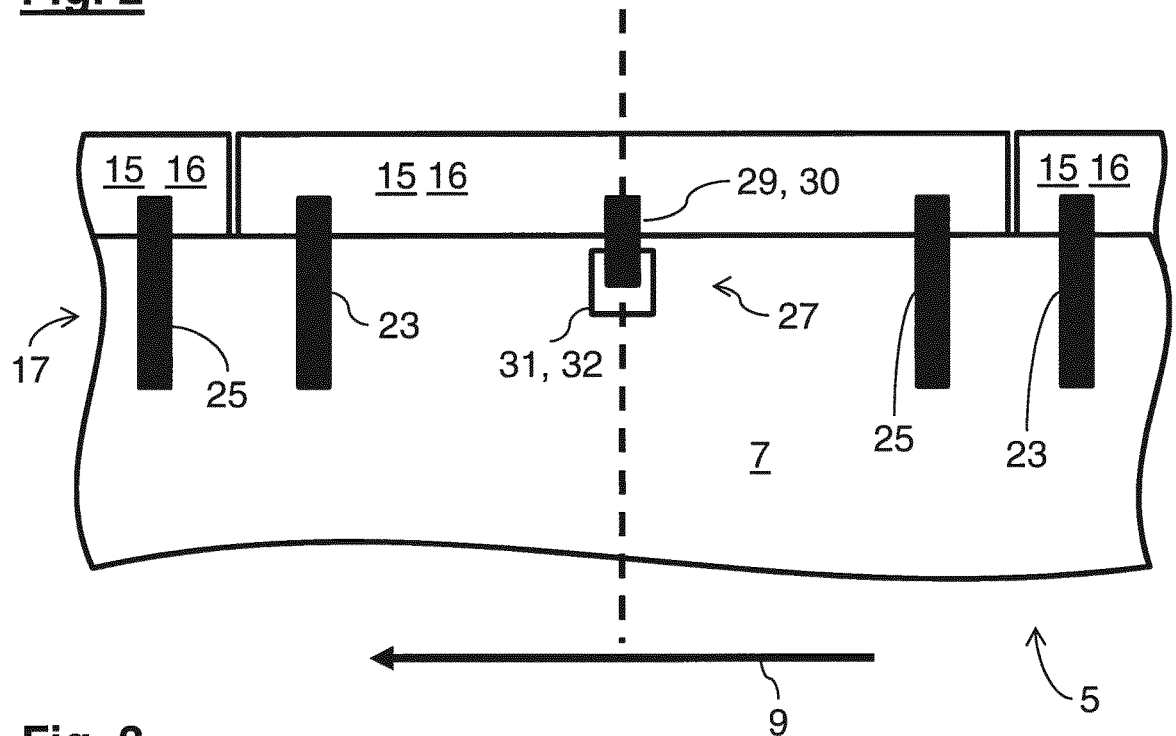
Figure 4A:
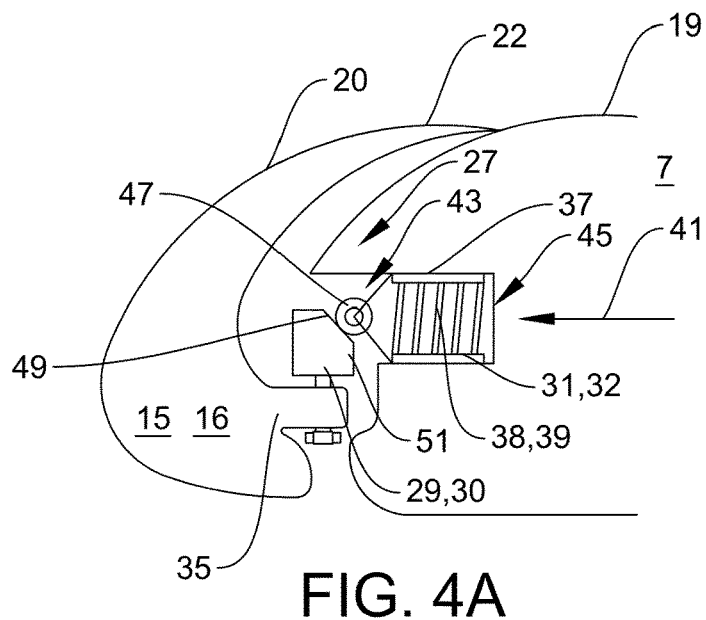
Figure 4B:
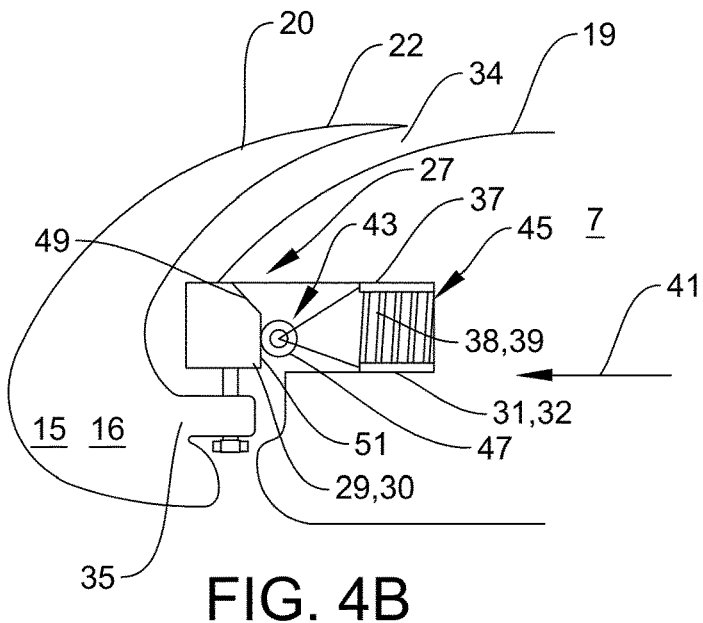
Figure 4C:
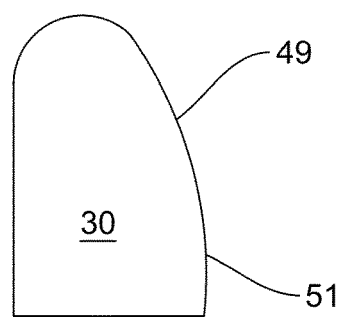

In the following, exemplary embodiments of a wing for an aircraft including exemplary embodiments of a hold-down arrangement will be described with reference to the drawings, wherein FIG. 1 shows an exemplary embodiment of an aircraft with an exemplary embodiment of a wing, FIG. 2 shows a schematic drawing of an exemplary embodiment of a wing with an exemplary embodiment of a hold-down arrangement with a high-lift device in a deployed position, FIG. 3 shows a schematic drawing of the exemplary embodiment of a wing of FIG. 2 with the high-lift device in retracted deployed position, FIG. 4a shows sectional drawing of an exemplary embodiment of a wing in a first operating mode comprising an exemplary embodiment of a hold-down arrangement, FIG. 4b shows a second drawing of the exemplary embodiments of FIG. 4a with the wing in a second operating mode, FIG. 4c shows a sectional drawing of an exemplary embodiment of a rigid hold-down element, FIG. 5a shows a sectional drawing of another exemplary embodiment of a wing in a first operating mode comprising another exemplary embodiment of a hold-down arrangement and FIG. 5b shows another sectional drawing of the exemplary embodiment of FIG. 5a with the wing in the first operating mode, FIG. 5c shows a second drawing of the exemplary embodiments of FIG. 5a with the wing in a second operating mode and FIG. 5d shows a sectional drawing of an exemplary embodiment of a hold-down arrangement.

In the following description of exemplary embodiments of aircraft, wings for aircraft and hold-down arrangements like elements will be designated with like reference numerals throughout all drawings. The description will commence with FIG. 1 where an exemplary embodiment of an aircraft is shown, continue with FIGS. 2 and 3 which show a schematic drawing of a section of an exemplary embodiment of a wing and finally turn towards FIGS. 4a, 4b and 4c as well as 5a, 5b, 5c and 5d which each show a sectional drawing of a wing with a hold-down arrangement.

FIG. 1 shows a top view of an exemplary embodiment of an aircraft 1 with a fuselage 3 and two wings 5. Each wing 5 comprises a fixed wing 7 extending in a spanwise direction 9 between an inward end or wing root ii and an outward end or wing tip 13. The wings 5 further comprise a plurality of high-lift devices 15 in form of slats 16 mounted to the leading edge 17 of the fixed wings 7. Since FIG. 1 shows a top view of the aircraft 1, the upper surfaces 19, 20 forming the respective suction side of the fixed wings 7 and the high-lift devices 15 are visible. In FIG. 1 the high-lift devices 15 are shown in respective retracted positions in which the upper surfaces 20 of the high-lift devices 15 extend flush with the upper surfaces 19 of the fixed wings 5.

FIGS. 2 and 3 each show a schematic view of a section of an exemplary embodiment of a wing 5 from below the wing 5, i.e., from the opposing side of the upper surface 19 shown in FIG. 1. The wing 5 may, in particular, be one of the wings 5 shown in FIG. 1. It comprises a fixed wing 7 and three high-lift devices 15 in form of slats 16 mounted to the leading edge 17 of the fixed wing 7. The fixed wing 7 and the inner and outer high-lift device 15 are shown in FIGS. 2 and 3 only partially. For example, neither the full length of the wing 5 in in the spanwise direction 9 nor its complete extension in the cordline direction are shown. Similarly, the inner and outer high-lift devices 15 shown in FIGS. 2 and 3 are also only shown in part in the spanwise direction 9 of the fixed wing 7.

In FIG. 2 the high-lift devices 15 are shown in a deployed position indicated by a gap 21 between the fixed wing 7 and the high-lift devices 15; in FIG. 3 the high-lift devices are shown in a retracted position in which the high-lift devices 15 overlap with the fixed wing 7 and are partly hidden behind the fixed wing 7. The high-lift devices 15 are mounted to the fixed wing 7 such that their respective trailing edges 22 (only visible in FIG. 2) are in extended contact with the upper surface 19 of the fixed wing 7. Since FIGS. 2 and 3 show the wing 5 from below, the trailing edges 22 of the high-lift devices 15 are not visible in FIG. 3. However, for the sake of completeness it is noted that a trailing edge 22 of a high-lift device 15 in extended contact with the upper surface 19 of a fixed wing 7 is shown in FIGS. 4a, 4b, 5a, 5b and 5c.

Each of the high-lift devices 15 is mounted to the leading edge 17 of the fixed wing 7 via a first support 23 and a second support 25. The supports 23, 25 are spaced apart from one another in the spanwise direction 9 of the wing 5 and enable the movement of the high-lift devices 15 between the deployed position shown in FIG. 2 and the retracted position shown in FIG. 3. One of the first and second supports 23, 25, for example, the respective first supports 23 may be driven via a drive unit (not shown) for moving the high-lift devices or slats 15. The second supports 25 may be not driven such that they only follow the motion induced by the first support 23. In such an embodiment where the high-lift devices 15 are slats 16, the first supports 23 may also be referred to as master slat tracks 23 and the second supports 25 may also be referred to as slave slat tracks 25.

As previously discussed, the lift and drag on the fixed wing 7 as well as other motions of the aircraft 1 deform the fixed wing 7 along the spanwise direction 9 of the wing 5. As each high-lift device 15 is only attached via two supports 23, 25 to the fixed wing 7, the deformation of the fixed wing 7 along the spanwise direction is not transmitted to the high-lift device. In particular, any upwards bending of the wing tip 13 caused by the increasing lift of the wing 5 with increasing velocity of the aircraft 1 would cause the fixed wing 7 to move downwards relative to the trailing edge 22 of the high-lift devices 15 in the region between the first and second supports 23, 25. This may cause the respective trailing edges 22 of the high-lift devices 15 to detach from the upper surface 19 of the fixed wing 7 so that the upper surfaces 19, 20 of the fixed wing 7 and the high-lift devices 15 are no longer flush and the aerodynamic performance of the wing 5 are affected negatively. In particular, the drag may be increased.

Hence, for each of the high-lift devices 15 a hold-down arrangement 27 is provided which comprises a first hold-down element 29 attached to the respective high-lift device 15 and a second hold-down element 31 attached to the fixed wing 7. Only the hold-down arrangement 27 of the high-lift device 15 in the center of FIGS. 2 and 3 is shown. The hold-down arrangement 27 is arranged between first and second supports 23, 25 of the respective high-lift device 15.

As can be seen in FIGS. 2 and 3, when the high-lift devices 15 are in their respective deployed position, the first hold-down element 29 attached to the high-lift device 15 is not in contact with the second hold-down element 31 attached to the fixed wing 7. However, when the high-lift device 15 is in the retracted position, the first hold-down element 29 comes into contact with the second hold-down element 31. In other words, the first hold-down element 29 is only in contact with the second hold-down element 31 when the high-lift device 15 to which the first hold-down element 29 is mounted is in its retracted position. It should be pointed out that for technical reason a first contact will need to be established before the high-lift device 15 has reached its final retracted position. However, the contact is essentially limited to the retracted position.

Once the first and second hold-down elements 29, 31 have come into contact or have been brought into engagement with one another, the second hold-down element 31 holds the first hold-down element 29 down and thus transmits any relative downward deformation of the fixed wing 7 to the high-lift device 15. Thereby, the high-lift device 15 is forced to deform with the fixed wing 7 and the trailing edge 22 is prevented from detaching from the upper surface 20 of the fixed wing 7.

In order to limit enforced spanwise deformation of the high-lift devices 15, the first hold-down element is formed as a rigid hold-down element 30 and the second hold-down element 31 is formed as a load-limited hold-down element 32 which comprises an elastically deformable biasing means (not shown in FIGS. 2 and 3). The biasing means and the entire hold-down arrangement are configured such that in a first operating mode of the wing 5 it acts onto the rigid hold-down element 30 to prevent detaching of the trailing edge 22 of the high-lift device 15 from the upper surface 19 of the fixed wing. The wing 5 operates in the first operating mode when the load transferred through the hold-down arrangement 27 does not exceed an operational threshold.

When the wing 5 transitions from the first operating mode to a second operating mode in which the load acting along the load path provided by the hold-down arrangement 27 onto the high-lift device 15 reaches and exceeds the operational threshold, the biasing means deforms elastically to a degree that it does not further act onto the rigid hold-down element 30 for preventing the trailing edge 22 of the high-lift device 15 from detaching from the fixed wing 7. In consequence, the trailing edge 22 is no longer forced downwards by the hold-down arrangement 27 and does not further have to follow the deformation of the fixed wing 7 to avoid high loads on the high-lift device 15 due to excessive enforced deformation. However, this will result in the trailing edge 22 detaching from the fixed wing which negatively affects the aerodynamic performance. This is preferable in the second operating mode of the wing 5 as compared to having to provide more rigid and therefore heavier high-lift device 15 and fixed wing 7 that can withstand the loads caused by the enforced deformation of the high-lift device 15.

The operational threshold is chosen such that the hold-down arrangement 27 prevents the trailing edge 22 of the high-lift device 15 from detaching from the upper surface 19 of the fixed wing 7 during regular flight conditions and common flight maneuvers. When the loads exceed the operational threshold, i.e., reach the structural or operational limits of the slats 16, for example, when the aircraft 1 operates in corners of the flight envelope, i.e., during extreme flight conditions, the biasing means deforms elastically to a degree that the connection between the fixed wing 7 and the high-lift device 15 provided by the hold-down arrangement 27.

FIGS. 4 and 4b shows a more detailed exemplary embodiment of a wing 5 comprising an exemplary embodiment of a hold-down arrangement 27. The wing 5 may, for example, be the wing 5 of FIG. 1, 2 or 3. Only a partial section through the wing 5 is shown in in FIGS. 4a and 4b which may, for example, be taken along the dashed line 33 in FIG. 3. With regard to features of the wing 5 not shown in FIGS. 4a and 4b reference is made to FIGS. 1 to 3.

The wing 5 shown in FIGS. 4a and 4b also comprises a fixed wing 7 to which a high-lift device 15 in form of a slat 16 is mounted using two supports (not shown). In FIGS. 4a and 4b the slat 16 is shown in the retracted position. FIG. 4a shows the wing 5 in a first operating in which its trailing edge 22 is in extended contact with the upper surface 19 of the fixed wing 7 such that the upper surfaces 19, 20 of the high-lift device is and the fixed wing 7 form a continuous surface. In FIG. 5b the wing 5 is in the second operating mode and the trailing edge 22 of the high-lift device is has detached from the upper surface 19 of the fixed wing 7 as indicated by a gap 34.

The wing 5 comprises a hold-down arrangement 27 with a first and a second hold down element 29, 31. The first hold-down element 29 is rigid hold-down element 30 which is adjustable and mounted to a hold-down rib 35 of the slat is. The rigid hold-down element 30 is adjustable in that its height relative to the hold-down rib 35 can be adjusted to adapt the position of the slat is in its retracted position. The first hold-down element 29 is in contact with the second hold-down element 31 that is also part of the hold-down arrangement 27.

The second hold-down element 31 is a load-limited hold-down element 32 that is mounted to the fixed wing 7 via a rib 37. The load-limited hold-down element 32 comprising a biasing means 38 in form of a compression spring 39 and extends in an extension direction 41 between a free end 43 and a fixed end 45. The fixed end 45 is mounted to the rib 37 of the fixed wing 7. At the free end 43 of the load-limited hold-down element 32 a contact roller 47 has been mounted.

In FIG. 4a, which shows the wing 5 in the first operating mode, the contact roller 47 is in contact with a contact surface 49 of the rigid hold-down element 30. The contact surface 49 is tilted relative to the extension direction 41 of the load-limited hold-down element 32 at angle of about 45° and has a constant slope. When load is transmitted through the hold-down arrangement 27 onto the high-lift device 15, the compression 39 is compressed elastically in the extension direction 41 as the contact roller 47 roles along the contact surface 49 of the rigid hold-down element 30. However, the force acting through the first and second hold-down element 29, 31 onto the high-lift device 15 is still sufficient for keeping the trailing edge 22 of the high-lift device 15 in extended contact with the upper surface 19 of the fixed wing 7.

When the load transmitted through the hold-down arrangement 27 reaches and exceeds the operational threshold, the biasing means 38 is compressed to an extent that the contact roller 47 is no longer in contact with the contact surface 47 but with a glide surface 51 of the rigid hold-down element which extends perpendicular to the extension direction 41. While the load-limited hold-down element 32 remains in contact with the rigid hold-down element 30, it cannot further transfer any loads that would push the high-lift device 15 downwards and keep the trailing edge 22 in extended contact with the upper surface 19 of the fixed wing 7. This advantageously stops any further enforced deformation of the high-lift device 15 and prevents high loads thereon caused by an excessive deformation of the fixed wing 7 along the spanwise direction 9.

The contact roller 47 prevents stick-and-slip effects in the contact region of the first and second hold-down elements 29, 31 so that the operational threshold can be effectively controlled.

FIG. 4c shows an alternative embodiment of a rigid hold-down element 30 that could be used in the embodiment of FIGS. 4a and 4b. Here, the tilt of the contact surface 47 relative to the extension direction 41 continuously changes and approaches a value of 90° where the contact surface 47 continuously transitions into the glide surface 51. The continuous transition has the advantage that the hold-down arrangement 27 and the high-lift device 15 do not experience sudden load changes due to the gradual transition from the contact surface 47 to the glide surface 51.

FIGS. 5a, 5b and 5c show another exemplary embodiment of a wing 5 comprising an exemplary embodiment of a hold-down arrangement 27. The wing 5 and the hold-down arrangement 27 of FIGS. 5a, 5b and 5c only differ from the wing 5 and the hold-down arrangement 27 of FIGS. 4a and 4b in the way the hold-down arrangement is formed. Thus, the description of the embodiments of FIGS. 5a, 5b and 5c will be limited to those aspects that differ from the embodiment of FIGS. 4a and 4b. The wing 5 shown in FIGS. 5a, 5b and 5c may be a cut through the wing 5 shown in FIGS. 2 and 3 along the dashed line 33.

The second hold-down element 31 of the embodiment shown in FIGS. 5a, 5b, 5c is also formed as a load-limited hold-down element 32. However, instead of a compression spring 39 it includes a biasing means in form of a cantilever spring 53. The fixed end 45 of the cantilever spring 53 is mounted to the rib 37 of the fixed wing 7 and the free end 43 is provided to be in contact with the dome-shaped rigid hold-down element 32.

As can be seen best in FIG. 5a, when no load acts on the cantilever spring 53, it essentially extends in the extension direction 41 between its free end 43 and its fixed end 45. In FIG. 5a the trailing edge 22 of the high-lift device 15 is in contact with the upper surface 19 of the fixed wing 7. When loads are transmitted through the hold-down arrangement 27 in order to keep the trailing edge 22 in contact with the upper surface 19, the load-limited hold-down element 32 is in contact with the rigid hold-down element 30. Due to the forces acting through the hold-down arrangement 27, the cantilever spring 53 bends upwards as can be seen in FIG. 5b. Nevertheless, since the cantilever spring 53 remains in contact with the rigid hold-down element 30, the trailing edge 22 is kept in extended contact with the upper surface 19 a can be seen in FIG. 5b.

However, if the loads transmitted through the hold down arrangement 27 reach and exceed the operational threshold, the cantilever spring 53 bends upwards to an extent that the rigid hold-down element 30 can slide past the cantilever spring 53 so that no downward acting force can be transmitted through the hold-down arrangement 27 as can be seen in FIG. 5c. The load path provided in the first operating mode of the wing 5 when the load is below the operational threshold is disconnected when the operational threshold is exceeded and the wing is in the second operating mode. Hence, once the operational threshold is reached, the high-lift device 15 is no longer forced to deform with a downward deformation of the fixed wing 7 and the loads acting on the high-lift device 15 and the fixed wing 7 are considerably reduced.

FIG. 5d shows an alternative embodiment of a cantilever spring 53 which is a laminate cantilever spring comprising a plurality of layers 55. The number of layers 55 forming the cantilever spring 53 decreases towards the free end 43 of the load-limited hold-down element 32. As can be seen in FIG. 5d, the layers 55 are not connected towards the free 43 end of the load-limited hold-down element 32 such that bending the cantilever spring 53 at the free end 43 a downwards direction which is directed opposite to the upwards direction requires less force than bending the cantilever spring 53 in the upwards direction. This reduces the force that is required to reset the hold-down element 27 after the wing 5 has transitioned from the first operating mode to the second operating mode.

The invention claimed is:

1. A wing for an aircraft, comprising:
   a fixed wing with a leading edge extending along a spanwise direction of the fixed wing and an upper surface forming a suction side of the fixed wing,
   a high-lift device movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing, and a hold-down arrangement arranged between the first support and the second support and comprising a first hold-down element attached to the high-lift device and a second hold-down element attached to the fixed wing, wherein the hold-down arrangement is configured such that the first hold-down element is in contact with the second hold-down element when the high-lift device is in the retracted position but is not in contact with the second hold-down element when the high-lift device is in the deployed position and wherein in the retracted position of the high-lift device the hold-down arrangement prevents the trailing edge of the high-lift device from detaching from the upper surface of the fixed wing when the fixed wing deforms in the spanwise direction, wherein one of the first hold-down element and the second hold-down element is a load-limited hold-down element comprising an elastically deformable biasing means and the other of the first hold-down element and the second hold-down element is a rigid hold-down element, wherein the hold-down arrangement is configured such that when the wing is in a first operating mode in which the high-lift device is in the retracted position and a load transmitted through the hold-down arrangement for preventing the trailing edge of the high-lift device from detaching from the upper surface of the fixed wing does not exceed an operational threshold, the biasing means of the load-limited hold-down element acts onto the rigid hold-down element to prevent the trailing edge of the high-lift device from detaching from the upper surface of the fixed wing, wherein the hold-down arrangement is further configured such that when the wing is in a second operating mode in which the high-lift device is in the retracted position and the load transmitted through the hold-down arrangement for preventing the trailing edge of the high-lift device from detaching from the upper surface of the fixed wing reaches and exceeds the operational threshold, elastic deformation of the biasing means results in the biasing means not further acting onto the rigid hold-down element for preventing the trailing edge of the high-lift device from detaching from the upper surface of the fixed wing, wherein the load-limited hold-down element extends from a fixed end to a free end in an extension direction when the load-limited hold-down element is not in contact with the rigid hold-down element, wherein the fixed end of the load-limited hold-down element is attached at an attachment point to the fixed wing in case the second hold-down element is the load-limited hold-down element or is attached an attachment point to the high-life device in case the first hold-down element is the load-limited hold-down element, wherein the hold-down arrangement is configured such that when the wing is in the first operating mode, the free end of the load-limited hold-down element interacts with a contact surface of the rigid hold-down element, the contact surface being tilted relative to the extension direction of the load-limited hold-down element at an angle of less than 90°, and wherein the hold-down arrangement is further configured such that when the wing is in the second operation mode, the free end of the load-limited hold-down element does not interact with the rigid hold-down element or interacts with a glide surface of the rigid hold-down element extending perpendicular to the extension direction of the load-limited hold-down arrangement.

2. The wing according to claim 1, wherein the second hold-down element is the load-limited hold-down element.

3. The wing according to claim 1, wherein the contact surface of the rigid hold-down element is shaped such that a tilt of an area of the contact surface in contact with the load-limited hold-down element relative to the extension direction of the load-limited hold-down element continuously increases towards 90° with increasing load which is transmitted through the hold-down arrangement for preventing the trailing edge of the high-lift device from detaching from the upper surface of the fixed wing in the first operating mode of the wing.

4. The wing according to claim 1, wherein the contact surface is tilted at a constant angle relative to the extension direction of the load-limited hold-down element.

5. The wing according to claim 1, wherein the biasing means is a cantilever spring, wherein the cantilever spring is bend in an upwards direction when load is transmitted through the hold-down arrangement for preventing the trailing edge of the high-lift device from detaching from the upper surface of the fixed wing in the first operating mode of the wing.

6. The wing according to claim 5, wherein the cantilever spring is a laminate cantilever spring formed from a plurality of layers, wherein the number of layers forming the cantilever spring decreases towards the free end of the load-limited hold-down element and wherein at least some of the layers are not connected towards the free end of the load-limited hold-down element such that bending the cantilever spring at the free end in a downwards direction which is directed opposite to the upwards direction requires less force than bending the cantilever spring in the upwards direction.

7. The wing according to claim 1, wherein the biasing means is a compression spring which is being compressed along the extension direction of the load-limited hold-down element when the wing is in the first operating mode and load is transmitted through the hold-down arrangement for preventing the trailing edge of the high-lift device from detaching from the upper surface of the fixed wing in the first operating mode of the wing.

8. The wing according to claim 7, wherein a roller is mounted at the free end of the load-limited hold-down element for reducing friction between the load-limited hold-down element and the rigid hold-down element, wherein the hold-down arrangement is configured such that the rigid hold-down element interacts with the roller when the wing is in the first operating mode.

9. The wing according to claim 1, wherein the high-lift device is a slat, wherein the first support) is a master slat track and the second support is a slave slat track.

10. An aircraft comprising a fuselage and the wing according to claim 1.

11. A hold-down arrangement for a wing of an aircraft, the wing comprising a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing, wherein the hold-down arrangement comprises a first hold-down element attachable to the high-lift device of the wing and a second hold-down element attachable to the fixed wing of the wing such that the first hold-down element is in contact with the second hold-down element when the high-lift device is in the retracted position but is not in contact with the second hold-down element when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction, wherein one of the first hold-down element and the second hold-down element is a load-limited hold-down element comprising an elastically deformable biasing means and the other of the first hold-down element and the second hold-down element is a rigid hold-down element, wherein the hold-down arrangement is configured such that when the wing is in a first operating mode in which the high-lift device is in the retracted position and a load transmitted through the hold-down arrangement for preventing the trailing edge of the high-lift device from detaching from the upper surface of the fixed wing does not exceed an operational threshold, the biasing means of the load-limited hold-down element acts onto the rigid hold-down element to prevent the trailing edge of the high-lift device from detaching from the upper surface of the fixed wing, wherein the hold-down arrangement is further configured such that when the wing is in a second operating mode in which the high-lift device is in the retracted position and the load transmitted through the hold-down arrangement for preventing the trailing edge of the high-lift device from detaching from the upper surface of the fixed wing reaches and exceeds the operational threshold, elastic deformation of the biasing means results in the biasing means not further acting onto the rigid hold-down element for preventing the trailing edge of the high-lift device from detaching from the upper surface of the fixed wing, wherein the load-limited hold-down element extends from a fixed end to a free end in an extension direction when the load-limited hold-down element is not in contact with the rigid hold-down element, wherein the fixed end of the load-limited hold-down element is attached at an attachment point to the fixed wing in case the second hold-down element is the load-limited hold-down element or is attached an attachment point to the high-life device in case the first hold-down element is the load-limited hold-down element, wherein the hold-down arrangement is configured such that when the wing is in the first operating mode, the free end of the load-limited hold-down element interacts with a contact surface of the rigid hold-down element, the contact surface being tilted relative to the extension direction of the load-limited hold-down element at an angle of less than 90°, and wherein the hold-down arrangement is further configured such that when the wing is in the second operation mode, the free end of the load-limited hold-down element does not interact with the rigid hold-down element or interacts with a glide surface of the rigid hold-down element extending perpendicular to the extension direction of the load-limited hold-down arrangement.

* * * * *